(12) United States Patent
Dharwada et al.

(10) Patent No.: US 9,525,976 B2
(45) Date of Patent: Dec. 20, 2016

(54) BIM-AWARE LOCATION BASED APPLICATION

(75) Inventors: Pallavi Dharwada, Morristown, NJ (US); Soumitri Kolavennu, Morristown, NJ (US); Paul Derby, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 127 days.

(21) Appl. No.: 13/468,573

(22) Filed: May 10, 2012

(65) Prior Publication Data

US 2013/0303193 A1 Nov. 14, 2013

(51) Int. Cl.
*H04W 4/04* (2009.01)
*H04W 4/20* (2009.01)

(52) U.S. Cl.
CPC .............. *H04W 4/043* (2013.01); *H04W 4/20* (2013.01)

(58) Field of Classification Search
CPC . G01C 21/206; G01R 22/063; H04L 12/2823; H04W 4/043; H04W 4/20; G06Q 10/08; G06Q 10/087; G08B 13/19656; G08B 13/19615; G08B 17/00; G08B 25/00; G05B 2219/32014; G06F 19/3418
USPC ............ 455/414.1, 421, 456.1, 456.3
See application file for complete search history.

(56) References Cited

U.S. PATENT DOCUMENTS

| | | | |
|---|---|---|---|
| 2003/0080978 A1* | 5/2003 | Navab et al. ............. | 345/633 |
| 2004/0088115 A1* | 5/2004 | Guggari et al. ........... | 702/13 |
| 2009/0022362 A1* | 1/2009 | Gagvani ............. | G06T 7/2053 382/100 |
| 2009/0240519 A1* | 9/2009 | Ichikawa et al. ............ | 705/1 |
| 2009/0307255 A1 | 12/2009 | Park | |
| 2010/0219950 A1* | 9/2010 | Kong et al. ............. | 340/540 |
| 2011/0071656 A1* | 3/2011 | McKiel, Jr. .............. | 700/90 |
| 2011/0084806 A1* | 4/2011 | Perkins .............. | 340/10.1 |

(Continued)

OTHER PUBLICATIONS

Brian McClendon, "A new frontier for Google Maps: mapping the indoors", Google Official Blog, Nov. 29, 2011 (3 pages).

(Continued)

*Primary Examiner* — George Eng
*Assistant Examiner* — Hung Du
(74) *Attorney, Agent, or Firm* — Brooks, Cameron & Huebsch, PLLC

(57) ABSTRACT

Systems, methods, and computer-readable and executable instructions are provided for implementing a BIM-aware location based application on a mobile device. Implementing a BIM-aware location based application on a mobile device can include displaying a floor plan of a building on the mobile device. Implementing a BIM-aware location based application on a mobile device can also include implementing a number of BIM equipment representations throughout the floor plan of the building on the mobile device. Implementing a BIM-aware location based application on a mobile device can also include providing real-time status information for the number of BIM equipment representations on the mobile device. Furthermore, implementing a BIM-aware location based application on a mobile device can include updating the floor plan with the implanted number of BIM equipment representations and real-time status information based on a determined location of the mobile device.

18 Claims, 4 Drawing Sheets

(56) References Cited

U.S. PATENT DOCUMENTS

2011/0087988 A1* 4/2011 Ray .................. G06Q 10/06
                                                    715/771
2011/0106561 A1* 5/2011 Eaton et al. .................. 705/3
2012/0101749 A1* 4/2012 Garrett et al. ............... 702/58
2013/0085588 A1   4/2013 Brun et al.

OTHER PUBLICATIONS

Artur Krukowski, et al. Comprehensive Building Information Management System Approach. International Journal of Simulation Systems, Science & Technology, vol. 11, No. 3, pp. 12-28, May 2010.
Andreas Fernbach, et al. Interoperability at the Management Level of Building Automation Systems: A Case Study for BACnet and OPC UA, IEEE ETFA. pp. 1-8. 2011.

* cited by examiner

BIM-AWARE LOCATION BASED APPLICATION

TECHNICAL FIELD

The present disclosure relates to a building information model (BIM)-aware location based application for a mobile device.

BACKGROUND

Building information modeling (BIM) can refer to the generation and/or management of data associated with a building (e.g., data associated with the components, equipment, and/or properties of a building). For example, BIM data can include architectural, mechanical, electrical, plumbing, sanitary, fire, and/or geometrical information associated with a building.

The leading international standard for describing the data contained within a building information model is called the Industry Foundation Classes (IFC), which is an open standard designed and maintained by the Building Smart Alliance. This is a very comprehensive standard that provides for the description of data related to many sub-domains related to the design, build, construction, and/or operation of a built environment (e.g., building).

The amount of BIM data associated with a building, and codified or expressed in the IFC standard, tends to be proportional to the size of the building, and can grow exponentially based on the number of specific sub-domains that are identified and documented in the BIM, including, for example, plumbing, electrical, or HVAC systems. Therefore, even a small building with very complete information for many different systems within the building may have a very large amount of BIM data associated therewith.

DETAILED DESCRIPTION

Figure 1:
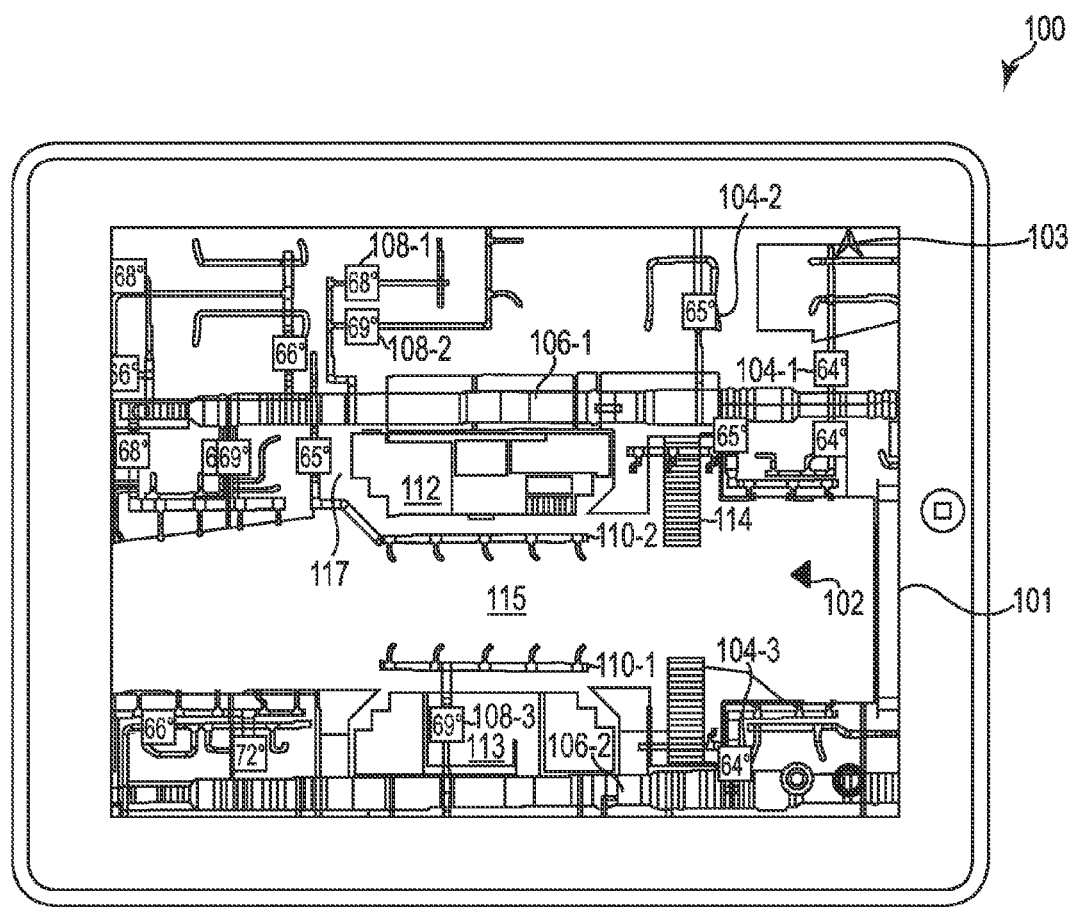
FIG. 1 illustrates a mobile device displaying a BIM-aware location based application in accordance with one or more embodiments of the present disclosure.

Devices, methods, and systems for implementing a BIM-aware location based application on a mobile device are described herein. For example, one or more embodiments can include displaying a floor plan of a building (e.g., single building, campus with multiple buildings, campus with multiple structures, etc.) on the mobile device. One or more embodiments can also include implementing a number of BIM equipment representations throughout the floor plan of the building on the mobile device. One or more embodiments can also include providing real-time status information for the number of BIM equipment representations on the mobile device. Furthermore, one or more embodiments can include updating the number of BIM equipment representations and real-time status information based on a determined location of the mobile device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of objects" can refer to one or more objects.

FIG. 1 illustrates a mobile device 100 displaying a BIM-aware location based application in accordance with one or more embodiments of the present disclosure. The mobile device 100 can be a number of various mobile devices (e.g., tablet, personal digital assistant, smartphone, etc.). The mobile device 100 can utilize a number of selection techniques (e.g., touch screen selection, cursor selection, etc.). For example, the mobile device can be a touch screen tablet that can enable a user to select various options within the location based application. The various options can include a number of options to change a view to a desired portion of the building. For example, if a user desires to view a floor plan and corresponding BIM equipment for floor 1, the user can utilize the number of opt ions to display the floor plan and corresponding BIM equipment for floor 1.

As described herein, a building can include, but is not limited to: a single building structure, a building complex comprising multiple structures, a campus comprising multiple structures located in a designated area, etc. For example, a building can include a multistory office building, a single story house, and/or a college campus.

The mobile device 100 can display a number of features. For example, the mobile device 100 can display: a floor plan, a number of BIM equipment representations, real-time status data for the number of BIM equipment representations, and location information.

The floor plan can include features of the building that can allow a, user to navigate through the building. For example, the floor plan can include, but is not limited to: location of rooms 112, size of rooms, room identification, stair location 114, elevator location, emergency device location, hallways, exits, emergency exits, utility rooms, building identification, walking path identification, roads, various structures, etc. Features that can allow a user to navigate through a building and/or campus can be different for various locations and/or buildings. For example, different buildings can utilize various techniques for identifying floors and/or areas of the building. In another example, different campuses can utilize various techniques for identifying a number of structures within the campus. The various identifying techniques can be incorporated into the location based application. For example, if a number of rooms within the building each have a name instead of a number, the location based application can display the name of each of the number of rooms throughout the building. In another example, a campus may have underground tunnels each individually numbered.

The number of BIM equipment representations can include a number of various system equipment within a building (e.g., campus, etc.). For example, the number of BIM equipment representations can include systems, such as: a heating, ventilation, air conditioning (HVAC) system, a plumbing system, an electrical system, lighting system, fire system, security system, etc.

The number of BIM equipment representations can be based upon actual BIM data of the building and/or campus. In some cases the actual BIM data may be unavailable and/or not exist. For example, an older building may not have BIM data that represents the building and the equipment within the building. Equipment data can be produced in the absence of BIM data for a particular building. For example, HVAC equipment data can be known for a particular building that does not have BIM data associated with the particular building. In this example, the known HVAC data can be implemented throughout the floor plan of the particular building. The known HVAC data for the particular building in the previous examples can be utilized to perform the functions described herein.

The mobile device 100 in FIG. 1 displays an example HVAC system with a corresponding floor plan of a building. For example, a variable air volume (VAV) box 108-3 can correspond to room 113. The number of BIM equipment can correspond to the floor plan in a number of ways. For example, the number of BIM equipment can be in a same relative location as the corresponding floor plan. The same relative location can include the number of BIM equipment being within the walls of a particular location, being within the interior portion of a room, etc. For example, a VAV box 108-3 can be within the walls and/or above the ceiling of room 113. In another example, a diffuser can be within the interior portion of a room. The location of BIM equipment can also be the location of an access area for the BIM equipment. For example, an access area can be a door and/or a location where the BIM equipment can be physically accessed.

The number of VAV boxes 108-1, 108-2, 108-3, 104-1, 104-2, 104-3 can be at a corresponding position within the floor plan. The number of VAV boxes 108-1, 108-2, 108-3, 104-1, 104-2, 104-3 can be implemented in a floor plan to display a location of the VAV boxes 108-1, 108-2, 108-3, 104-1, 104-2, 104-3 within the floor plan. For example, VAV box 108-3 is located at the same location as room 113.

The number of BIM equipment for the HVAC system can include a number of main air ducts 106-1, 106-2. The number of main air ducts 106-1, 106-2 can be located above the ceiling of a current floor plan displayed. For example, if the current floor plan displayed in Figure represents Floor 1 of the building, the main air ducts 106-1, 106-2 can be located above the ceiling of Floor 1 and below the floor of a Floor 2.

The number of BIM equipment can include a variety of equipment that can determine real-time status information. The real-time status information can include information collected through a number of sensors within and/or near the number of BIM equipment. For example, the number of BIM equipment for the HVAC system can include a number of VAV boxes 108-1, 108-2, 108-3, 104-1, 104-2, 104-3. The number of BIM equipment can determine real-time status information for a particular area of the HVAC system. For example, the number of VAV boxes 108-1, 108-2, 108-3, 104-1, 104-2, 104-3 can include a number of sensors to determine real-time status information for a number of characteristics (e.g., air flow, temperature of air within VAV box, temperature settings, humidity, etc.).

The real-time status information can include information collected through a number of existing systems (e.g., lighting systems, HVAC systems, security systems, fire systems, etc.). For example, the real-time status information can include real-time video display from an existing security system. The real-time video display from the security system can allow a user of the BIM aware location based application to view live video of desired locations. For example, a user may desire to view a particular room to confirm a report that a diffuser is no longer connected to the ceiling of the particular room. In another example, a user may desire to view a particular area to determine how to navigate to the particular area.

The number of VAV boxes 108-1, 108-2, 108-3, 104-1, 104-2, 104-3 can transmit the real-time status information for the number of characteristics to the BIM-aware location based application in real-time. For example, the number of VAV boxes 108-1, 108-2, 108-3, 104-1, 104-2, 104-3 can include a number of sensors that are connected to an antenna that enables the VAV boxes 108-1, 108-2, 108-3, 104-1, 104-2, 104-3 to transmit real-time temperature information to the BIM-aware location based application.

The BIM-aware location based application can receive the number of characteristics and display the number of characteristics at a location of the corresponding number of VAV boxes 108-1, 108-2, 108-3, 104-1, 104-2, 104-3. For example, VAV box 108-3 can send the number of characteristics to the BIM-aware location based application and the BIM-aware location based application can display the received number of characteristics. For example, the BIM-aware location based application can display a temperature of VAV box 108-3 as being 69°. In the same example, the BIM-aware location based application can display a set temperature of 70°. The measurement system (e.g., metric, imperial, etc.) of the display of the number of characteristics can be altered to a desired system. For example, the temperature can be displayed in Celsius (C), Fahrenheit (F), and/or Kelvin (K).

The BIM-aware location based application can generate a color code for the number of BIM equipment. The color code can represent a number of operation states of the number of BIM equipment. The number of operation states can be based on a number of the number of characteristics received from the number of BIM equipment. For example, the number of operations states can be based on the received temperature of a VAV box 108-1, 108-2, 108-3, 104-1, 104-2, 104-3 and a set temperature of the VAV box 108-1, 108-2, 108-3, 104-1, 104-2, 104-3.

The number of operation states can include a normal operation state. The normal operation state can occur when the number of received characteristics are within a predetermined range. For example, if the received characteristic is temperature within a VAV box 108-1, 108-2, 108-3, 104-1, 104-2, 104-3, the predetermined range can be between 67° F. and 73° F. The normal operation state can be based on a manufacturer recommendation for the number of BIM equipment. For example, VAV box 108-3 can have a manufacture recommended temperature range of 67° F. to 73° F. for a particular set temperature (e.g., 70° F.).

The BIM-aware location based application can utilize the color code to alert a user of BIM equipment that is outside or within the predetermined threshold. For example, the BIM-aware location based application can display a first color for VAV boxes within the predetermined range. For example, VAV boxes 108-1, 108-2, 108-3 can be represented in a first color (e.g., non-alerting color, light color, blue, white, etc.). The BIM-aware location based application can display a second color for VAV boxes outside the predetermined range. For example, VAV boxes 104-1, 104-2, 104-3 can be represented in a second color (e.g., alerting color, dark color, various shades of red, etc.).

The BIM-aware location based application can utilize a number of alert functions of the mobile device 100 to alert a user when a number of BIM equipment are outside the predetermined range. For example, the BIM-aware location based application can generate a number of audio warnings in the event that a number BIM equipment are outside the predetermined range. For example, if 108-3 drops in temperature from 69° to 66°, the BIM-aware location based application can execute instructions to cause the mobile device 100 to produce an alert signal (e.g., audio alarm, audio buzz, vibrating of the device, etc.).

The alert signal can include a number of directions from the current location of the mobile device 100 to the number of BIM equipment that are outside the predetermined range. For example, the alert can be issued similar to a text message that would include a description of a piece BIM equipment outside the predetermined threshold and how the user can navigate to the piece of BIM equipment. In another example, the BIM-aware location based application can give turn-by-turn directions to the piece of BIM equipment that is outside the predetermined threshold. For example, the BIM-aware location based application can give audio and visual directions to the location and dynamically update the directions based on the location of the mobile device 100. For example, the BIM-aware location based application can determine the movement of the mobile device and update the turn-by-turn directions from a current location of the mobile device 100.

The BIM-aware location based application can display location information. Location information can include a number of spatial relationships: for the floor plan, for the number of BIM equipment, and/or for the mobile device 100.

The number of spatial relationships for the floor plan can include a distance between a number of objects within the floor plan. For example, the distance between the staircase 114 and the room 113 can be 3 meters.

The number of spatial relationships for the number of BIM equipment can be a distance between the number of BIM equipment. The distance between the number of BIM equipment can be determined in a variety of ways. The distance between the number of BIM equipment can be a distance between two pieces of BIM equipment following a system of connections. For example, the distance between a section of the main duct 106-1 of the HVAC system and a VAV box 108-2 can be the distance of ductwork that connects the main duct 106-1 and the VAV box 108-2. The distance between the number of BIM equipment can be a distance between a piece of BIM equipment and a floor of the building. For example, the distance between the VAV box 108-2 and the floor could be seven feet. In this example, the information could be used by the user of the mobile device to determine if specific equipment is needed to perform maintenance on the piece of BIM equipment (e.g., a ladder, a harness, a scissor lift, etc.).

The distance between the number of BIM equipment can also be a distance between an access point of a first piece of BIM equipment and an access point of a second piece of BIM equipment following a path of the floor plan. For example the distance between VAV box 108-3 and VAV box 108-2 can be the distance following the floor plan out of room 113 into a hallway 115 and a hallway 117 to an access point for VAV box 108-2. The distance between two access points of the BIM equipment can include a stairway 114 to a different level of the building.

Location information of the mobile device 100 can include a location within the floor plan. For example, a location indicator 102 can be displayed to indicate where the mobile device 100 is located within the floor plan. The location indicator 102 can be adjusted to move to a corresponding location of the floor plan as the mobile device moves. For example, if a user carrying the mobile device moves down hallway 115, the location indicator 102 can be dynamically updated and move down hallway 115 to correspond with the location of the mobile device 100. Dynamically updated can include updating to account for movements of the mobile device 100. For example, the location indicator 102, floor plan, and corresponding BIM equipment can be updated at a number of time intervals (e.g., updates every second, updates every 10 seconds, etc.) to account for movement through the building. In another example, the dynamic updates can include an update for a detected change in position. For example, if the BIM-aware location based application determines that the mobile device 100 has changed position, the location indicator 102, floor plan, and corresponding BIM equipment can be updated.

The view of the floor plan and corresponding BIM equipment can be updated to include information corresponding to current location of the location indicator 102. For example, if the mobile device 100 moves to a second floor, the floor plan and corresponding BIM equipment can be updated to represent the second floor plan and BIM equipment located on the second floor. In the same example, the location indicator 102 can also be displayed at the current location of the mobile device 100 on the second floor.

The BIM-aware location based application can determine a current location of the mobile device 100 in a variety of ways. The BIM-aware location based application can determine the current location of the mobile device 100 utilizing a global positioning system (GPS). For example, the mobile device 100 can be equipped with GPS capabilities and the BIM-aware location based application can utilize the GPS capabilities of the mobile device 100. The BIM-aware location based application can also determine the current location of the mobile device 100 utilizing a wireless network (e.g., local area network (LAN), wide area network (WAN), etc.) within the building. The BIM-aware location based application can determine a current location of the mobile device 100 by utilizing a number of wireless signal transmitters (e.g., wireless modem, wireless router, etc.) placed at a number of locations throughout the building. The BIM-aware location based application can determine the number of locations for each of the number of wireless signal transmitters within the building and calculate a current location utilizing a signal strength for each of the number of wireless signal transmitters.

The location information of the mobile device 100 can include a description of the location within the floor plan.

For example, the description of the location can include a level of the building that the mobile device 100 is located.

The location information of the mobile device 100 can include a distance between the mobile device and a desired piece of BIM equipment. For example, if room 113 is selected, the location information can include a distance between a current location of the mobile device 100 and/or indicator 102 and the room 113. The location information between the current location of the mobile device 100 and the room 113 can also include a description of the location of the room 113 (e.g., floor of the building, directions to room 113, etc.). The description of the location of a selected area, object within the floor plan, and/or piece of BIM equipment can be displayed and/or presented in an audio format. For example, a description of the location of a selected room 113 can be displayed on the mobile device 100. In another example, an audio description of the location of a selected room 113 can be played on the mobile device 100.

As described herein, the floor plan and the corresponding BIM equipment can be displayed for the current location of the mobile device. A predetermined portion of the floor plan view and corresponding BIM equipment can also be selected utilizing a number of navigating functions. For example, the number of navigating functions can include, a "zoom in" function, a "zoom out" function, a "rotate" function, a "problems" function, a "BIM equipment selection" function, among other functions to enable navigation of the floor plan view and corresponding BIM equipment.

The "zoom in" function can increase the size of a desired area within the floor plan and the corresponding BIM equipment. For example, if the desired area includes room 113 the "zoom in" function can increase the size of room 113 and a number of objects within the desired area. The "zoom in" function can remove the floor plan and the corresponding BIM equipment outside the desired area and display only the desired area. For example, the "zoom in" function can enable selection of a desired area, wherein the desired area can be expanded and/or enlarged to a size of the display 101 on the mobile device 100. The "zoom in" function can increase an amount of detail for a number of objects within the floor plan and/or a number of corresponding BIM equipment.

The "zoom out" function can decrease the size of a current view of the floor plan and the corresponding BIM equipment. For example, the "zoom out" function can expand the view of the floor plan and corresponding BIM equipment and include additional floor plan and corresponding BIM equipment within the display 101 on the mobile device. The "zoom out" function can decrease the detail of individual objects but increase the area of the floor plan and corresponding BIM equipment.

The "rotate" function can change a display viewpoint of the floor plan and corresponding BIM equipment. For example, the "rotate" function can change the floor plan 90° in a clockwise direction. A compass 103 can show the cardinal directions of the floor plan. For example, the compass 103 is showing north at a first direction (e.g., top of the screen) and the "rotate" function can change the display viewpoint of the floor plan so the north side of the floor plan can be in a second direction (e.g., right side of the screen).

The "rotate" function can be enabled manually by a user and/or the "rotate" function can be enabled automatically. For example, as the mobile device moves through the building, the "rotate" function can change the display viewpoint of the floor plan and corresponding BIM equipment to match a user viewpoint. For example, if the back of the mobile device is pointing in a north direction (e.g., user is facing north holding the mobile device), the BIM-aware location based application can display the floor plan and corresponding BIM equipment where the north direction of the building is at the top of the display 101. In the same example, if the back of the mobile device is pointing in a west direction, the BIM-aware location based application can automatically change the display viewpoint of the floor plan and corresponding BIM equipment to display the west direction of the building at the top of the display 101.

The "problems" function can automatically display BIM equipment that is malfunctioning. The "problems" function can automatically change a current view to a view of a VAV box that is outside the predetermined range. For example, the "problems" function can automatically change the current view in FIG. 1 and use the "zoom in" function to display VAV box 104-1.

The "problems" function can display multiple BIM equipment that is malfunctioning. For example, the "problems" function can display a list of VAV boxes 104-1, 104-2, 104-3 that are outside a predetermined threshold and allow selection of a VAV box from the list of VAV boxes 104-1, 104-2, 104-3. Upon selection of a VAV box from the list of VAV boxes 104-1, 104-2, 104-3 the "problems" function can automatically display the selected VAV box. For example, if VAV box 104-3 is selected the "problems" function can change a current view to a display including VAV box 104-3. The display including VAV box 104-3 can include a view with increased detail as described herein by utilizing the "zoom in" function.

The "BIM equipment selection" function can display a status information user interface upon selection of a piece of BIM equipment. For example, if VAV box 104-1 is selected (e.g., utilizing a touch screen selection and/or a cursor selection, etc.) the status information user interface can be displayed.

The real-time status information, floor plan, corresponding BIM equipment, and current location of the mobile device 100 can be exported to a remote computing device. For example, the dynamically updated location data can be sent to a remote computing device to enable a remote user to determine a location of the mobile device 100. The number of navigating functions can also be exported to the remote computing device. For example, a user of the mobile device 100 may be utilizing a number of navigating functions to view a predetermined portion of the floor plan and corresponding BIM equipment, the current view of the predetermined portion can be exported to the remote computing device. The remote computing device can include any number of computing devices include a display (e.g., desktop computer, laptop, mobile device, etc.).

Figure 2:
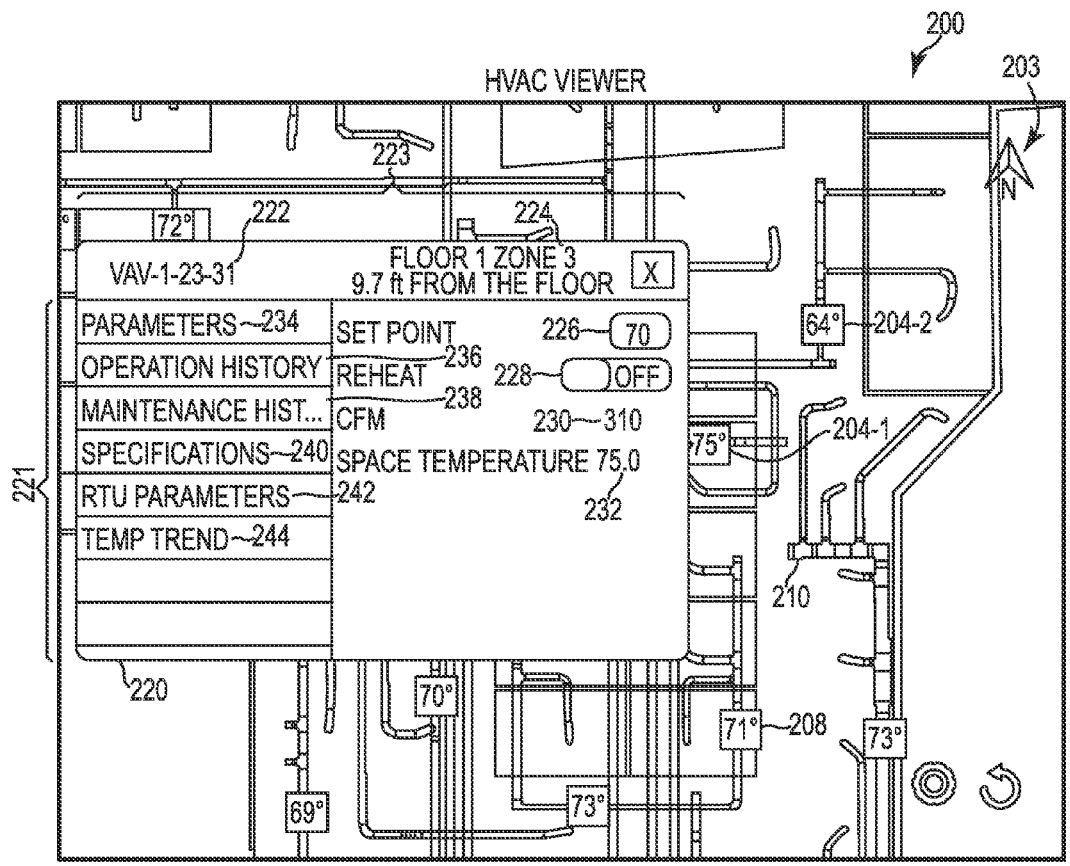
FIG. 2 illustrates a display of a status information user interface in accordance with one or more embodiments of the present disclosure.

FIG. 2 illustrates a display of a status information user interface 220 in accordance with one or more embodiments of the present disclosure. The status information user interface 220 can be displayed by the BIM-aware location based application upon selection of a piece of BIM equipment. Any number of BIM equipment that corresponds to a building and/or found on a campus can be selected (e.g., an air handling unit, a roof top unit (RTU), a chiller, a security device, a piece of fire equipment, a piece of plumbing equipment, etc.). For example, if VAV box 204-1 is selected, information within a business management system (e.g., Enterprise Buildings Integrator™) can be displayed within the status information user interface.

The status information user interface 220 can include a header 223. The header 223 can include general descriptive information for the selected BIM equipment. For example, the header 223 can include a name 222 (e.g., general name, serial number, number within BIM, etc.). The header 223 can include a location 224. For example, the location 224 can be a room, a sector, a zone, etc. In another example, the location can include a further description of an access point for the selected BIM equipment (e.g., 9.7 feet from the floor, south wall, etc.).

The status information user interface 220 can include a number of tabs 221. The number of tabs 221 can include a number of various data relating to the selected BIM equipment representations. For example, the selected BIM equipment can include: VAV box 208, VAV box 204-1, 204-2, and/or ductwork 210, among other BIM equipment.

The number of tabs 221 can include a parameters tab 234. The parameters tab 234 can include the current conditions existing within the selected BIM equipment. For example, if VAV box 204-1 is selected the parameters tab 234 can display a set point 226, a reheat switch 228, an air flow 230 (e.g., cubic feet per minute (CFM), etc.), and/or a temperature 232.

The set point 226 can display a current temperature setting for the VAV box 204-1. For example, the current temperature setting can be set at 70 (e.g., 70° F., etc.). The set point 226 can be altered to a desired temperature setting (e.g., via the building control system (EBI)). For example, if the desired temperature setting is 71° F., the set point 226 can be altered and the VAV box 204-1 can receive instruction to change the temperature settings to a set point of 71° F.

The reheat switch 228 can be an option to enable a reheat mode for the VAV box 204-1. For example, the reheat mode for the VAV box 204-1 can defrost the VAV box 204-1 and can be enabled by selecting an "on" option. When selecting the "on" option, the BIM-aware location based application can send instructions to the VAV box 204-1, wherein the VAV box 204-1 can receive the instructions and perform the reheat function.

The air flow 230 can display a current air flow for the VAV box 204-1. For example, a number of air flow sensors within the VAV box 204-1 can detect the air flow and send the detected air flow to the BIM-aware location based application in real-time. The air flow can include an amount of air moving through the VAV box 204-1 over a period of time.

The space temperature 232 can display a current temperature within the VAV box 204-1. For example, the VAV box 204-1 can include a number of temperature sensors that can send the detected temperature to the BIM-aware location based application in real-time.

The number of tabs can also include an operation history tab 236. The operation history tab 236 can include a history of maintenance for the VAV box 204-1. For example, the operation history tab 236 can include a number of repairs, a technician name, and/or description of the number of repairs that have previously been performed.

The number of tabs can also include a maintenance history tab 238 for the VAV box 204-1. For example, the maintenance history tab 238 can include a number of repairs, a technician name, and/or description of the number of repairs that have previously been performed.

The number of tabs can also include a specifications tab 240. The specifications tab 240 can include a number of specifications for the VAV box 204-1. For example, the number of specifications can include access to original electronic documentation for the VAV box 204-1, including: serial numbers, part numbers, fan capabilities, temperature ranges, threshold ranges, warranty information, among other specifications for the VAV box 204-1. The specifications tab 240 can also include maintenance information. Maintenance information can include a number of tutorials on to perform maintenance on the selected device according to manufacturer specifications. For example, selecting maintenance information can display tutorials on how to clean a VAV box.

The number of tabs can also include a roof top unit (RTU) parameters tab 242. The RTU parameters tab 242 can include a number of parameters for the RTU. For example, the RTU can have a set point, an air flow, and/or an output temperature. The RTU parameters tab 242 can enable changes to settings for the RTU that supplies air to the VAV box 204-1. For example, the RTU can receive parameter changes from the BIM-aware location based application and implement the parameter changes.

The number of tabs can also include a temperature (temp) trend tab 244. The temp trend tab 244 can include historic temperature data for the VAV box 204-1. For example, the temp trend tab 244 can display a number of recorded temperatures of the VAV box 204-1 over a period of time.

Figure 3:
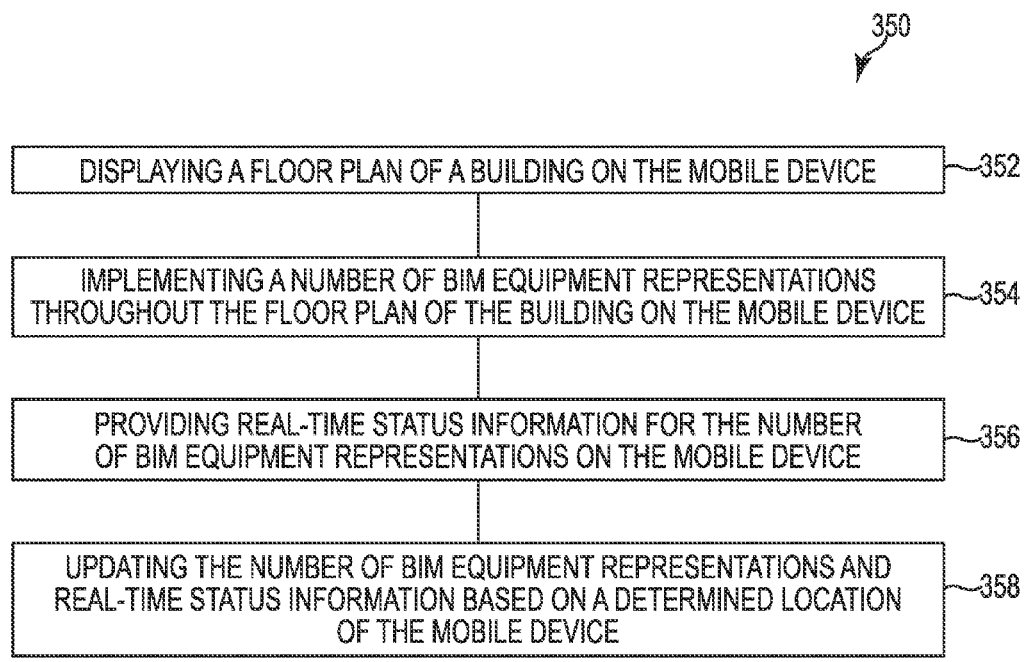
FIG. 3 illustrates a method for implementing a BIM-aware location based application on a mobile device in accordance with one or more embodiments of the present disclosure.

FIG. 3 illustrates a method 350 for implementing a BIM-aware location based application on a mobile device in accordance with one or more embodiments of the present disclosure.

At 352, a floor plan is displayed on the mobile device. The floor plan can be a navigation display (e.g., map) of a number of floors of a building. The floor plan can illustrate a number of navigational features including: rooms, stairways, hallways, elevators, etc.

At 354 a number of BIM equipment representations are implemented throughout the floor plan of the building. The number of BIM equipment representations can be implemented throughout the floor plan by including a number of BIM equipment within corresponding positions of the floor plan. For example, if VAV box 1 is found in Room A of a building, the VAV box 1 can be displayed within Room A of the floor plan of the building. In the same example, VAV box 1 can be within a specific location of Room A. For example, VAV box 1 can be located near the ceiling in the northeast corner of Room A and can be displayed in the northeast corner of Room A in the floor plan.

At 356, real-time status information for the number of BIM equipment representations are provided. Real-time status information can be provided to the BIM-aware location based application from any number of BIM equipment utilizing a number of sensors. For example, VAV boxes can include a number of sensors to provide various real-time data (e.g., temperature, air flow, etc.) to the BIM-aware location based application.

At 358, the floor plan with the implemented number of BIM equipment representations and real-time status information based on a determined location is updated. As described herein a location within a building can be determined in a variety of ways. For example, GPS can utilized in some cases to determine a location within a building. In another example, a wireless network within the building can be utilized to determine a location within the building.

The floor plan with the implemented BIM equipment representations can be updated based on the determined building location. For example, if it is determined that the mobile device is within Room A, the floor plan with the implemented BIM equipment representations can be updated to include the floor plan and the BIM equipment representations within Room A.

Figure 4:
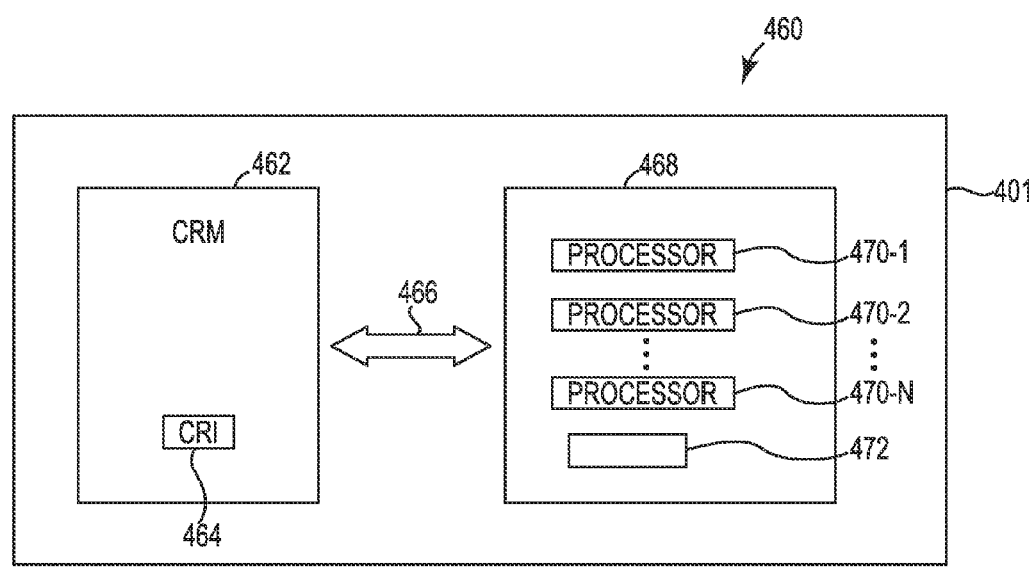
FIG. 4 illustrates a block diagram of an example of a computer-readable medium in communication with processing resources for implementing a BIM-aware location based application on a mobile device in accordance with one or more embodiments of the present disclosure.

FIG. 4 illustrates a block diagram 460 of an example of a computer-readable medium (CRM) 462 in communication with processing resources 470-1, 470-2, . . . , 470-N for implementing a BIM-aware location based application on a mobile device in accordance with one or more embodiments of the present disclosure.

The mobile device, as described herein, can also include computing device 401. The computing device 401 can include a CRM 462 in communication with processing resources 470-1, 470-2, ..., 470-N. CRM 462 can be in communication with a device 401 (e.g., a Java® application server, among others) having processor resources 470-1, 470-2, ..., 470-N. The computing device 401 can be in communication with a tangible non-transitory CRM 462 storing a set of computer-readable instructions (CRI) 464 executable by one or more of the processing resources 470-1, 470-2, ..., 470-N, as described herein. The CRI 464 can also be stored in remote memory managed by a server and represent an installation package that can be downloaded, installed, and executed. The computing device 401 can include memory resources 472, and the processing resources 470-1, 470-2, ..., 470-N can be coupled to the memory resources 472.

Processing resources 470-1, 470-2, ..., 470-N can execute CRI 464 that can be stored on an internal or external non-transitory CRM 462. The processing resources 470-1, 470-2, ..., 470-N can execute CRI 464 to perform various functions. For example, the processing resources 470-1, 470-2, ..., 470-N can execute CRI 464 to display real-time status information for a number of BIM equipment representations into the floor plan of a building. A non-transitory CRM (e.g., CRM 462), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 462 can be integral, or communicatively coupled, to a computing device, in a wired and/or a wireless manner. For example, the non-transitory CRM 462 can be an internal memory, a portable memory, a portable disk, or a memory associated with another computing resource (e.g., enabling CRIs to be transferred and/or executed across a network such as the Internet).

The CRM 462 can be in communication with the processing resources 470-1, 470-2, ..., 470-N via a communication path 466. The communication path 466 can be local or remote to a machine (e.g., a computer) associated with the processing resources 470-1, 470-2, ..., 470-N. Examples of a local communication path 466 can include an electronic bus internal to a machine (e.g., a mobile device 100, a computer) where the CRM 462 is one of volatile, non-volatile, fixed, and/or removable storage medium in communication with the processing resources 470-1, 470-2, ..., 470-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 466 can be such that the CRM 462 is remote from the processing resources e.g., 470-1, 470-2, ..., 470-N, such as in a network connection between the CRM 462 and the processing resources (e.g., 470-1, 470-2, ..., 470-N). That is, the communication path 466 can be a network connection. Examples of such a network connection can include a local area network (LAN), wide area network (WAN), personal area network (PAN), and the Internet, among others. In such examples, the CRM 462 can be associated with a first computing device and the processing resources 470-1, 470-2, ..., 470-N can be associated with a second computing device (e.g., a Java® server, etc.). For example, a processing resource 470-1, 470-2, ..., 470-N can be in communication with a CRM 462, wherein the CRM 462 includes a set of instructions and wherein the processing resource 470-1, 470-2, ..., 470-N is designed to carry out the set of instructions for implementing a BIM-aware location based application.

The processing resources 470-1, 470-2, ..., 470-N coupled to the memory 464 can calculate a current location within a building. The processing resources 470-1, 470-2, ..., 470-N coupled to the memory 464 can determine the current location within a floor plan of the building. The processing resources 470-1, 470-2, ..., 470-N coupled to the memory 464 can also implement real-time status information for a number of BIM equipment representations into the floor plan of the building. The processing resources 470-1, 470-2, ..., 470-N coupled to the memory 464 can also display the real-time status information for the number of BIM equipment representations and floor plan of the current location. The processing resources 470-1, 470-2, ..., 470-N coupled to the memory 464 can also provide selection options for the number of BIM equipment representations to retrieve building management options. The processing resources 470-1, 470-2, ..., 470-N coupled to the memory 464 can also provide navigation options to display the number of BIM equipment representations from various locations within the building. The processing resources 470-1, 470-2, ..., 470-N coupled to the memory 464 can also color code the number of BIM equipment representations based on the real-time status information. Furthermore, the processing resources 470-1, 470-2, ... 470-N coupled to the memory 464 can send an alert message for equipment BIM representations outside a display area for collected real-time status information that is outside a predetermined threshold, wherein the alert message includes turn-by-turn directions to the number of BIM equipment.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for implementing a building information model (BIM)-aware location based application on a mobile device, comprising:
    displaying a floor plan of a building on the mobile device based on a first determined location of the mobile device;
    implementing a number of BIM equipment representations throughout the floor plan of the building on the mobile device based on stored BIM data, wherein the number of BIM equipment representations are selectably visible based on the first determined location of the mobile device and based on a predetermined portion of the floor plan display that is made visible by selection from a set of functions that includes zoom-in, zoom-out, and rotate;
    receiving updated BIM data that includes real-time status information from system equipment within the building, wherein the real-time status information is collected via a number of sensors;
    providing real-time status information for the number of BIM equipment representations on the mobile device, wherein the number of BIM equipment representations are based on the first determined location of the mobile device and wherein the real-time status information is displayed at a position on the location of the BIM equipment representations displayed on the floor plan of the building;
    receiving an alert on the mobile device that physical equipment corresponding to the number of BIM equipment representations outside a predetermined operating threshold based on the real-time status information;
    displaying video confirmation of the alert on the mobile device of the physical equipment corresponding to the number of BIM equipment representations outside the predetermined operating threshold;
    providing a number of directions from the first location of the mobile device to a location of an access point for the physical equipment corresponding to the number of BIM equipment representations outside the predetermined operating threshold, wherein the location of the access point for the physical equipment and location of the physical equipment are different locations within the building; and
    updating the floor plan with the implemented number of BIM equipment representations and real-time status information based on a second determined location of the mobile device.

2. The method of claim 1, wherein updating the number of BIM equipment includes dynamically changing the BIM equipment representations with changes in the location of the mobile device.

3. The method of claim 1, wherein providing real-time status information includes displaying information collected from system equipment via the number of BIM equipment representations, and wherein a number of BIM equipment representations within the building are displayed with a color code, wherein the color code represents a particular operation state of corresponding system equipment represented by the number of BIM equipment representations, and wherein the BIM equipment representations are visible via the predetermined portion of the floor plan display.

4. The method of claim 1, wherein the predetermined portion is user defined.

5. The method of claim 3, further comprising, displaying the predetermined portion of the floor plan with implemented BIM equipment representations on a remote computing device.

6. The method of claim 1, wherein implementing a number of BIM equipment representations includes implementing a particular system of equipment.

7. A non-transitory computer-readable medium storing a set of instructions executable by a processor to cause a computer to:
    display a floor plan of a building and building information model (BIM) equipment representations for the building;
    determine a current location of a mobile device within the floor plan of the building;
    display the current location within the floor plan and surrounding BIM equipment representations for the current location based on stored BIM data of the determined location of the mobile device within the building, wherein the surrounding BIM equipment representations are selectably visible based on the current location of the mobile device and based on a predetermined portion of the floor plan display that is made visible by selection from a set of functions that includes zoom-in, zoom-out, and rotate;
    receive updated BIM data that includes real-time status information from system equipment within the building, wherein the real-time status information is collected via a number of sensors and wherein the real-time status information is displayed at a position on the location of the BIM equipment representations displayed on the floor plan of the building;
    display particular real-time status information based on selection of a corresponding BIM equipment representation displayed on the floor plan of the building;
    receive an alert on the mobile device that physical equipment corresponding to the number of BIM equipment representations is outside a predetermined operating threshold based on the real-time status information;
    display video confirmation of the alert on the mobile device of the physical equipment corresponding to the number of BIM equipment representations outside the predetermined operating threshold;
    provide a number of directions from the current location of the mobile device to a location of an access point for the physical equipment corresponding to the number of BIM equipment representations outside the predetermined operating threshold, wherein the location of the access point for the physical equipment and location of the physical equipment are different locations within the building; and display real-time status information for the displayed BIM equipment representations, wherein the BIM equipment representations are based on the determined location of the mobile device.

8. The medium of claim 7, further storing the set of instructions executable by the processor to cause the computer to provide an equipment selection tool for the BIM equipment representations.

9. The medium of claim 8, wherein selection of BIM equipment representations display equipment specification information.

10. The medium of claim 8, wherein selection of BIM equipment representations display equipment maintenance history information.

11. The medium of claim 8, further storing the set of instructions executable by the processor to cause the computer to display the alert when the real-time status information is outside a predetermined threshold.

12. The medium of claim 7, wherein the real-time status information is exported to a remote computing device.

13. A system for implementing a building information model (BIM)-aware location based application; the system comprising a mobile device with a processing resource in communication with a non-transitory computer readable medium, wherein the non-transitory computer readable medium includes a set of instructions and wherein the processing resource is designed to carry out the set of instructions to:
- display a floor plan of a building and BIM equipment representations for the building;
- calculate a current location within the building;
- determine the current location within the floor plan of the building;
- display the current location within the floor plan and surrounding BIM equipment representations for the current location based on stored BIM data of the determined location of the mobile device within the building, wherein the surrounding BIM equipment representations are selectably visible based on the current location of the mobile device and based on a predetermined portion of the floor plan display that is made visible by selection from a set of functions that includes zoom-in, zoom-out, and rotate;
- receive updated BIM data that includes real-time status information from system equipment within the building, wherein the real-time status information is collected via a number of sensors;
- provide real-time status information for the number of BIM equipment representations on the mobile device, wherein the number of BIM equipment representations are based on the determined location of the mobile device within the floor plan of the building;
- display the real-time status information for the number of BIM equipment representations, wherein the BIM equipment representations are based on the determined location of the mobile device and wherein the real-time status information is displayed at a position on the location of the BIM equipment representations displayed on the floor plan of the building; display particular real-time status information based on selection of a corresponding BIM equipment representation displayed on the floor plan of the building;
- receive an alert on the mobile device that physical equipment corresponding to the number of BIM equipment representations is outside a predetermined operating threshold based on the real-time status information;
- display video confirmation of the alert on the mobile device of the physical equipment corresponding to the number of BIM equipment representations outside the predetermined operating threshold;
- provide a number of directions from the current location of the mobile device to a location of an access point for the physical equipment corresponding to the number of BIM equipment representations outside the predetermined operating threshold, wherein the location of the access point for the physical equipment and location of the physical equipment are different locations within the building; and
- provide selection options for the number of BIM equipment representations to retrieve building management options.

14. The system of claim 13, wherein the building management options include a set of maintenance history information.

15. The system of claim 13, wherein the processing resource is designed to further carry out the set of instructions to provide navigation options to display the number of BIM equipment representations from various locations within the building.

16. The system of claim 13, wherein the processing resource is designed to further carry out the set of instructions to color code the number of BIM equipment representations on the mobile device based on the real-time status information, wherein the color code represents a particular operation state of corresponding system equipment represented by the number of BIM equipment representations, and wherein the BIM equipment representations are visible via a predetermined portion of the floor plan display.

17. The system of claim 16, wherein the color code can be used as an alert system to a user when it is determined that the real-time status information is outside a predetermined threshold.

18. The system of claim 13, wherein the building management options includes function controls over the physical equipment represented by the BIM equipment representations.

* * * * *